(12) United States Patent
Mismar et al.

(10) Patent No.: US 9,762,456 B2
(45) Date of Patent: Sep. 12, 2017

(54) ACCESS NODE, CONTROL NODE, AND VARIOUS METHODS FOR ADAPTING A REPORTING PERIOD FOR A USER EQUIPMENT

(71) Applicant: TELEFONAKTIEBOLAGET L M ERICSSON (PUBL), Stockholm (SE)

(72) Inventors: Faris Mismar, Plano, TX (US); Sairamesh Nammi, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 14/660,399

(22) Filed: Mar. 17, 2015

(65) Prior Publication Data

US 2016/0277256 A1 Sep. 22, 2016

(51) Int. Cl.
*H04L 1/00* (2006.01)
*H04L 12/26* (2006.01)

(52) U.S. Cl.
CPC ............ *H04L 43/02* (2013.01); *H04L 1/0026* (2013.01); *H04L 1/0027* (2013.01); *H04L 43/067* (2013.01); *H04L 1/0031* (2013.01)

(58) Field of Classification Search
CPC ... H04L 1/0026; H04L 1/0027; H04L 1/0031; H04L 5/0057; H04L 43/0031
See application file for complete search history.

(56) References Cited

U.S. PATENT DOCUMENTS

| 2005/0191965 A1* | 9/2005 | Yu ......................... H04L 1/0026 455/67.16 |
|---|---|---|
| 2008/0057969 A1 | 3/2008 | Agami et al. |
| 2008/0205333 A1 | 8/2008 | Budianu et al. |
| 2009/0170437 A1 | 7/2009 | Bhattad et al. |
| 2010/0284351 A1 | 11/2010 | Liang et al. |
| 2011/0237283 A1 | 9/2011 | Shan et al. |
| 2012/0039207 A1 | 2/2012 | Eriksson et al. |
| 2012/0093016 A1 | 4/2012 | Zhang et al. |
| 2012/0134275 A1* | 5/2012 | Choi ..................... H04L 5/0057 370/241 |
| 2012/0314588 A1 | 12/2012 | Nammi |
| 2013/0022142 A1 | 1/2013 | Nammi |
| 2013/0028345 A1 | 1/2013 | Ko et al. |
| 2013/0163538 A1 | 6/2013 | Kuo |

FOREIGN PATENT DOCUMENTS

WO WO 2010/121537 10/2010

OTHER PUBLICATIONS

3rd Generation Partnership Project; Technical Specification Group Radio Access Network; Radio Resource Control (RRC); Protocol specification (Release 11). 3GPP TS 25.331 v11.11.0 (Sep. 2014).

* cited by examiner

*Primary Examiner* — Benjamin H Elliott, IV
*Assistant Examiner* — Prince A Mensah (57) ABSTRACT

An access node (e.g., Node B), a control node (e.g., RNC) and various methods are described herein for adapting a reporting period for a user equipment, wherein the reporting period indicates how often the user equipment is to send a feedback message containing a channel quality indicator (CQI) to the access node (e.g., Node B).

27 Claims, 8 Drawing Sheets

ACCESS NODE, CONTROL NODE, AND VARIOUS METHODS FOR ADAPTING A REPORTING PERIOD FOR A USER EQUIPMENT

TECHNICAL FIELD

The present disclosure relates to an access node (e.g., Node B), a control node (e.g., RNC) and various methods for adapting a reporting period for a user equipment, where the reporting period indicates how often the user equipment is to send a feedback message containing a channel quality indicator (CQI) to the access node (e.g., Node B).

BACKGROUND

The following abbreviations are herewith defined, at least some of which are referred to within the following description of the prior art and the present disclosure.
ACK Acknowledgement
AP Access Point
ARQ Automatic Repeat Request
ASIC Application-Specific Integrated Circuit
BS Base Station
BSC Base Station Controller
BTS Base Transceiver Station
CDMA2000 Code Division Multiple Access
CQI Channel Quality Indicator
D2D Device-to-Device
DAS Distributed Antenna System
DL Downlink
EPROM Erasable Programmable Read Only Memory
EEPROM Electrically Erasable Programmable Read-Only Memory
FDD Frequency Division Duplex
GERAN GSM EDGE Radio Access Network
GSM Global System for Mobile Communications
HARQ Hybrid Automatic Repeat Request
HS-DPCCH High Speed Dedicated Physical Common Control Channel
HSDPA High Speed Downlink Packet Access
HSPA High Speed Packet Access
HS-SCCH High Speed Shared Control Channel
HS-PDSCH High Speed Physical Data Shared Channel
LLE Laptop Embedded equipment
LME Laptop Mounted Equipment
LTE Long Term Evolution
M2M Machine-to-Machine
MIMO Multiple-Input and Multiple Output
MSR Multi-Standard Radio
NAK Non-Acknowledgement
NTBP Number of Transport Blocks Preferred
PCI Precoding Control Index
P-CPICH Primary Common Pilot Channel
PDCCH Physical Downlink Control Channel
PDSCH Physical Downlink Shared Channel
RAB Radio Access Bearer
RAM Random Access Memory
RAT Radio Access Technology
RNC Radio Network Node
RI Rank Information
ROM Read Only Memory
RRC Radio Resource Control
RRH Remote Radio Head
RRU Remote Radio Unit
RoT Rise Over Thermal
SIR Signal-to-Interference Ratio
TDD Time Division Duplex
TI Transaction Identifier
TTI Transmit Time Interval
UE User Equipment
USB Universal Serial Bus
UTRA Universal Terrestrial Radio Access
WLAN Wireless Local Area Network The Channel Quality Indicator (CQI) is the key indicator for HSDPA DL channel quality and its frequent reporting by the UE to the Node B is essential to maintain a good DL efficiency. The CQI is signaled from the UE to the Node B on one or several uplink HS-DPCCH physical channels, together with other channel state information, depending on the configured downlink transmission mode of the UE. A brief overview of the CQI reporting required by the HSDPA standard is provided next with respect to FIG. 1 (PRIOR ART).

Figure 1:
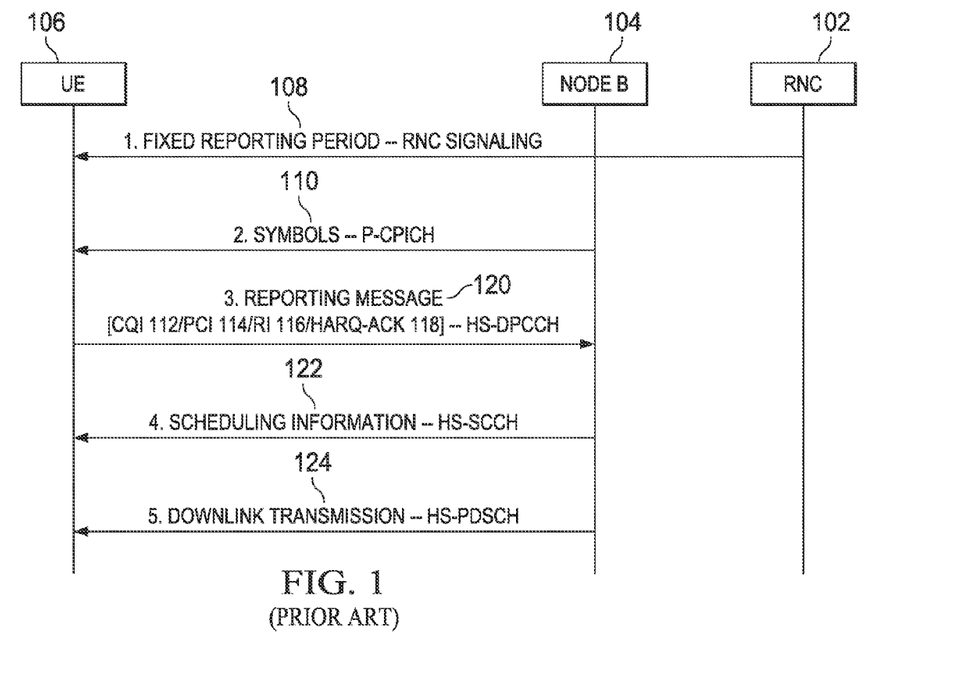
FIG. 1 (PRIOR ART) is a signal diagram illustrating the exchange of messages between a RNC, a Node B, and a UE to establish a data call setup which requires CQI reporting per the HSDPA standard.

Referring to FIG. 1 (PRIOR ART), there is a signal diagram illustrating the exchange of messages between a RNC 102, a Node B 104, and a UE 106 to establish a data call setup which requires CQI reporting per the HSDPA standard. At step 1, the RNC 102 communicates a reporting period 108 to the UE by RRC signaling either through RRC radio bearer configuration or RRC re-configuration. The RNC 102 sets the reporting period 108 for the UE 106 from a set of values which are provided in 3GPP TS 25.331 V11.11.0 dated Sep. 23, 2014 (the contents of which are incorporated by reference herein). Typically, the minimum CQI reporting period is one TI (2msec). Once the RRC setup is complete, then the Node B 104 at step 2 transmits known symbols 110 (pilots 110) on the Primary Common Pilot Channel (P-CPICH) to the UE 106. The UE 106 receives the known symbols 110 (pilots 110) and estimates the quality of the P-CPICH and computes a CQI 112, a precoding channel indicator 114 (PCI 114) (if applicable), and rank information 116 (RI 116) (if applicable). At step 3, the UE 106 transmits the CQI 112, PCI 114 (if applicable), and RI 116 (if applicable) along with a hybrid ARQ ACK/NAK 118 (HARQ-ACK 118) in a feedback message 120 to the Node-B 104 using the dedicated physical control channel (HS-DPCCH). The structure of the HS-DPCCH's feedback message 120 can take various forms depending on the specific configuration of the UE 106. Three exemplary HS-DPCCH's feedback messages 120a, 120b, and 120c are discussed in detail next with respect to FIGS. 2-4 (PRIOR ART).

Figure 2:
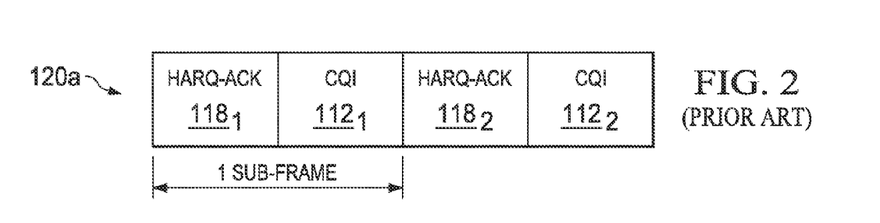
FIG. 2 (PRIOR ART) is a diagram illustrating the form of an exemplary HS-DPCCH's feedback message for a single carrier when the UE is configured in the non-MIMO mode.

Referring to FIG. 2 (PRIOR ART), there is a diagram illustrating the form of one exemplary HS-DPCCH's feedback message 120a for a single carrier when the UE 106 is configured in non-MIMO mode. As shown, the HS-DP-CCH's feedback message 120a comprises the following information: HARQ-ACK $118_1$, CQI $112_1$, HARQ-ACK $118_2$, and CQI $112_2$. The feedback message 120a is well known to one skilled in the art of wireless telecommunications.

Figure 3:
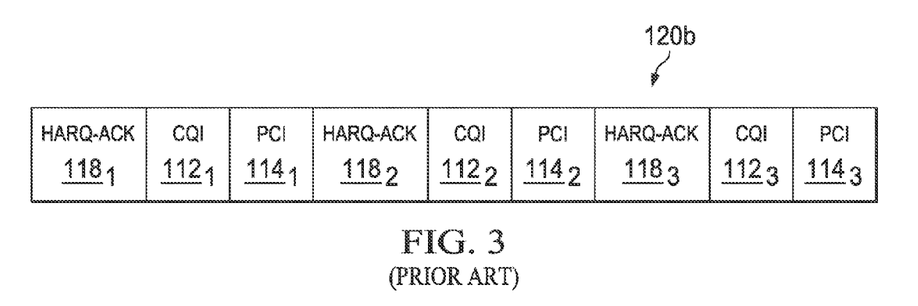
FIG. 3 (PRIOR ART) is a diagram illustrating the form of another exemplary HS-DPCCH's feedback message when the UE is configured in MIMO mode with two transmit antennas.

Referring to FIG. 3 (PRIOR ART), there is a diagram illustrating the form of another exemplary HS-DPCCH's feedback message 120b when the UE 106 is configured in MIMO mode with two transmit antennas. As shown, the HS-DPCCH's feedback message 120b comprises the following information: HARQ-ACK $118_1$, CQI $112_1$, PCI $114_1$, HARQ-ACK $118_2$, CQI $112_2$, PCI $114_2$, HARQ-ACK $118_3$, CQI $112_3$, PCI $114_3$. Each CQI $112_1$, $112_2$, and $112_3$ is computed as follows:

$$CQI = \begin{cases} 15 \times CQI_1 + CQI_2 + 31 & \text{when 2 transport blocks are preferred by the UE} \\ CQI_S & \text{when 1 transport block is preferred by the UE} \end{cases}$$

where CQI is the channel quality per individual layer also defined as transmission rank, which is defined as a MIMO branch with a distinct modulation and transport block size and a HARQ-process identifier.

It can be observed from FIG. 3 (PRIOR ART) and the above equation that if the CQI 112 is less than 31, then the RI 116 is 1, otherwise the RI 116 is 2. The PCI 114 is the precoding information bits which are selected from the subset of the codebook corresponding to the RI 116. The feedback message 120b is well known to one skilled in the art of wireless telecommunications.

Figure 4:
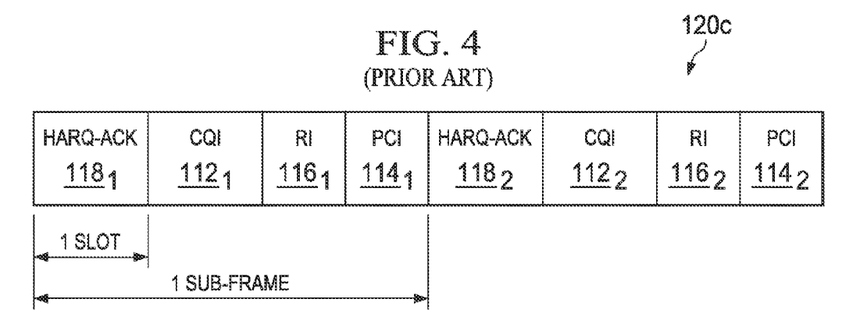
FIG. 4 (PRIOR ART) is a diagram illustrating the form of another exemplary HS-DPCCH's feedback message when the UE is configured in MIMO mode with four transmit antennas.

Referring to FIG. 4 (PRIOR ART), there is a diagram illustrating the form of another exemplary HS-DPCCH's feedback message 120c when the UE 106 is configured in MIMO mode with four transmit antennas. As shown, the HS-DPCCH's feedback message 120c comprises the following information: HARQ-ACK $118_1$, CQI $112_1$, RI $116_1$, PCI $114_1$, HARQ-ACK $118_2$, CQI $112_2$, RI $116_2$, PCI $114_2$. Each CQI $112_1$, and $112_2$ is computed as follows:

$$CQI = \begin{cases} 15 \times CQI_1 + CQI_2 & \text{when 2, 3 or 4 transport blocks are preferred by the UE} \\ CQI_S & \text{when 1 transport block is preferred by the UE} \end{cases}$$

where CQI is the channel quality per individual layer also defined as transmission rank, which is defined as a MIMO branch with a distinct modulation and transport block size and a HARQ-process identifier.

Thus, when the UE 106 is configured in MIMO mode with four transmit antennas, the UE 106 provides the Node B 104 the following: HARQ ACK information 118, CQI 112 per codeword, the number of transport blocks preferred (NTBP) also called rank information 116 (RI 116), and the precoding control index 114 (PCI 114). The feedback message 120c is well known to one skilled in the art of wireless telecommunications.

Referring again to FIG. 1 (PRIOR ART), the Node-B 104 upon receiving the feedback message 120 will at step 4 schedule and allocate to the UE 106 the required channelization codes, modulation and coding, precoding channel index, and rank information (if applicable). This scheduling information 122 is conveyed to the UE 106 by the High Speed Shared Control Channel (HS-SCCH). Once the UE 106 detects the HS-SCCH and receives the scheduling information 122, then the downlink transmission 124 to the UE 106 starts from the Node B 104 at step 5 through the High Speed Physical Data Shared Channel (HS-PDSCH).

As can be seen from FIG. 1's step 1, it is common practice today to configure the reporting period 108 for the UE 106 to a fixed value selected from a set of values which are provided in 3GPP TS 25.331 V11.11.0 dated Sep. 23, 2014. However, configuring a fixed value for the reporting period 108 to all the UEs 106 is not beneficial because all the UEs 106 will then need to transmit the feedback messages 120 even though the Node B 104 may not be using that channel quality immediately. Further, the transmissions of the feedback messages 120 on the HS-DPCCH from all the UEs 106 contributes to increase the interference level known as the rise over thermal (RoT) in the uplink. This increase in the interference level happens because all UEs 106 in uplink transmit using the same spreading codes and the UEs 106 are separated by non-orthogonal scrambling codes, which results in the uplink HSPA transmissions including the feedback messages 120 needing to share an interference limited resource. Hence, reducing the interference in uplink frequencies is desirable to ensure high SIR levels on the uplink transmission channel and to maintain a stable system operation. In addition, the UE 106 by having the fixed reporting period 108 is not an efficient use of the UE's battery power because the UE needs to compute the channel quality and report this channel state information to the Node B. Moreover, the UE 106 by having the fixed reporting period 108 does not enable the UE 106 to use all the benefits of Adaptive Modulation and Encoding (AMC) such as system capacity because some UEs may not need to make frequent updates of channel state information.

SUMMARY

An access node (e.g., Node B), a control node (e.g., RNC) and various methods which address the aforementioned shortcomings of the prior art by adapting a reporting period for a user equipment are described in the independent claims. Advantageous embodiments of the access node (e.g., Node B), the control node (e.g., RNC) and the various methods are further described in the dependent claims.

In one aspect, the present disclosure provides an access node (e.g., Node B) configured to adapt a reporting period for a user equipment which is configured for a primary carrier and a secondary carrier. The access node comprises at least one processor and at least one memory that stores processor-executable instructions, wherein the at least one processor interfaces with the at least one memory to execute the processor-executable instructions, whereby the access node is operable to perform a receive operation, a first compute operation, a second compute operation, a select operation, and a communicate operation. In the receive operation, the access node receives a first feedback message from the user equipment, where the first feedback message contains a first CQI of the secondary carrier. In the first compute operation, the access node computes a Doppler frequency ($F_{d2}$) of the secondary carrier using the first CQI of the secondary carrier. In the second compute operation, the access node computes a Doppler frequency ($F_{d1}$) of the primary carrier using the computed Doppler frequency ($F_{d2}$) of the secondary carrier. In the select operation, the access node selects a second reporting period for the user equipment based on the computed Doppler frequency ($F_{d1}$) of the primary carrier, where the selected second reporting period indicates how often the user equipment is to send a second feedback message containing a second CQI of the secondary carrier. In the communicate operation, the access node communicates the selected second reporting period for the user equipment to a control node (e.g., RNC). The access node operating in this manner has the following advantages (for example): (1) reducing the interference in uplink frequencies; (2) enhancing the use of the user equipment's battery power; and (3) utilizing all the benefits of AMC.

In another aspect, the present disclosure provides a method an access node (e.g., Node B) for adapting a reporting period for a user equipment which is configured for a primary carrier and a secondary carrier. The method comprises a receiving step, a first computing step, a second computing step, a selecting step, and a communicating step.

In the receiving step, the access node receives a first feedback message from the user equipment, where the first feedback message contains a first CQI of the secondary carrier. In the first computing step, the access node computes a Doppler frequency ($F_{d2}$) of the secondary carrier using the first CQI of the secondary carrier. In the second computing step, the access node computes a Doppler frequency ($F_{d1}$) of the primary carrier using the computed Doppler frequency ($F_{d2}$) of the secondary carrier. In the selecting step, the access node selects a second reporting period for the user equipment based on the computed Doppler frequency ($F_{d1}$) of the primary carrier, where the selected second reporting period indicates how often the user equipment is to send a second feedback message containing a second CQI of the secondary carrier. In the communicating step, the access node communicates the selected second reporting period for the user equipment to a control node (e.g., RNC). The method has the following advantages (for example): (1) reducing the interference in uplink frequencies; (2) enhancing the use of the user equipment's battery power; and (3) utilizing all the benefits of AMC.

In yet another aspect, the present disclosure provides a control node (e.g., RNC) configured to adapt a reporting period for a user equipment. The control node comprises at least one processor and at least one memory that stores processor-executable instructions, wherein the at least one processor interfaces with the at least one memory to execute the processor-executable instructions, whereby the control node is operable to perform a first configure operation, a second configure operation, a receive operation, and a re-configure operation. In the first configure operation, the control node configures the user equipment for a primary carrier and a secondary carrier. In the second configure operation, the control node configures the user equipment to have a first reporting period which indicates how often the user equipment is to send a first feedback message containing a first CQI for the secondary carrier to an access node (e.g., Node B). In the receive operation, the control node receives a message from the access node, where the message indicates a second reporting period to be used for the user equipment. In the re-configure operation, the control node re-configures the user equipment to have the second reporting period which indicates how often the user equipment is to send a second feedback message containing a second CQI for the secondary carrier to the access node. The control node operating in this manner has the following advantages (for example): (1) reducing the interference in uplink frequencies; (2) enhancing the use of the user equipment's battery power; and (3) utilizing all the benefits of AMC.

In still yet another aspect, the present disclosure provides a method in a control node (e.g., RNC) for adapting a reporting period for a user equipment. The method comprises a first configuring step, a second configuring step, a receiving step, and a re-configuring step. In the first configuring step, the control node configures the user equipment for a primary carrier and a secondary carrier. In the second configuring step, the control node configures the user equipment to have a first reporting period which indicates how often the user equipment is to send a first feedback message containing a first CQI for the secondary carrier to an access node (e.g., Node B). In the receiving step, the control node receives a message from the access node, where the message indicates a second reporting period to be used for the user equipment. In the re-configuring step, the control node re-configures the user equipment to have the second reporting period which indicates how often the user equipment is to send a second feedback message containing a second CQI for the secondary carrier to the access node. The method has the following advantages (for example): (1) reducing the interference in uplink frequencies; (2) enhancing the use of the user equipment's battery power; and (3) utilizing all the benefits of AMC.

In still yet another aspect, the present disclosure provides a method in a wireless communication system for adapting a reporting period for a user equipment. The method comprises a first configuring step, a second configuring step, a receiving step, a first computing step, a second computing step, a selecting step, and a re-configuring step. In the first configuring step, the wireless communication system configures the user equipment for a primary carrier and a secondary carrier. In the second configuring step, the wireless communication system configures the user equipment to have a first reporting period. In the receiving step, the wireless communication system receives a first feedback message from the user equipment, where the first feedback message contains a first CQI of the secondary carrier. In the first computing step, the wireless communication system computes a Doppler frequency ($F_{d2}$) of the secondary carrier using the first CQI of the secondary carrier. In the second computing step, the wireless communication system computes a Doppler frequency ($F_{d1}$) of the primary carrier using the computed Doppler frequency ($F_{d2}$) of the secondary carrier. In the selecting step, the wireless communication system selects a second reporting period for the user equipment based on the computed Doppler frequency ($F_{d1}$) of the primary carrier, wherein the selected second reporting period indicates how often the user equipment is to send a second feedback message containing a second CQI of the secondary carrier. In the re-configuring step, the wireless communication system re-configures the user equipment to have the second reporting period. In one embodiment, the wireless communication system comprises an access node and a control node, wherein the control node performs the two configuring steps, then the access node performs the receiving step, the two computing steps, the selecting step and further performs a communicating step in which the selected second reporting period is sent to the control node which then performs the re-configuring step. In another embodiment, the wireless communication system comprises an access node and a control node, wherein the control node performs the two configuring steps, then the access node performs the receiving step and further performs a communicating step in which the received first CQI of the secondary carrier is sent to the control node which then performs the two computing steps, the selecting step, and the re-configuring step. In yet another embodiment, the wireless communication system comprises an access node and a control node, wherein the control node performs the two configuring steps, then the access node performs the receiving step, the first computing step and further performs a communicating step in which the computed Doppler frequency ($F_{d2}$) of the secondary carrier is sent to the control node which then performs the second computing step, the selecting step, and the re-configuring step. In still yet another embodiment, the wireless communication system comprises an access node and a control node, wherein the control node performs the two configuring steps, then the access node performs the receiving step, the two computing steps and further performs a communicating step in which the computed Doppler frequency ($F_{d1}$) of the primary carrier is sent to the control node which then performs the selecting step, and the re-configuring step. The method has the following advantages (for example): (1) reducing the interference in uplink frequencies; (2) enhancing the use of the user equipment's battery power; and (3) utilizing all the benefits of AMC.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 5:
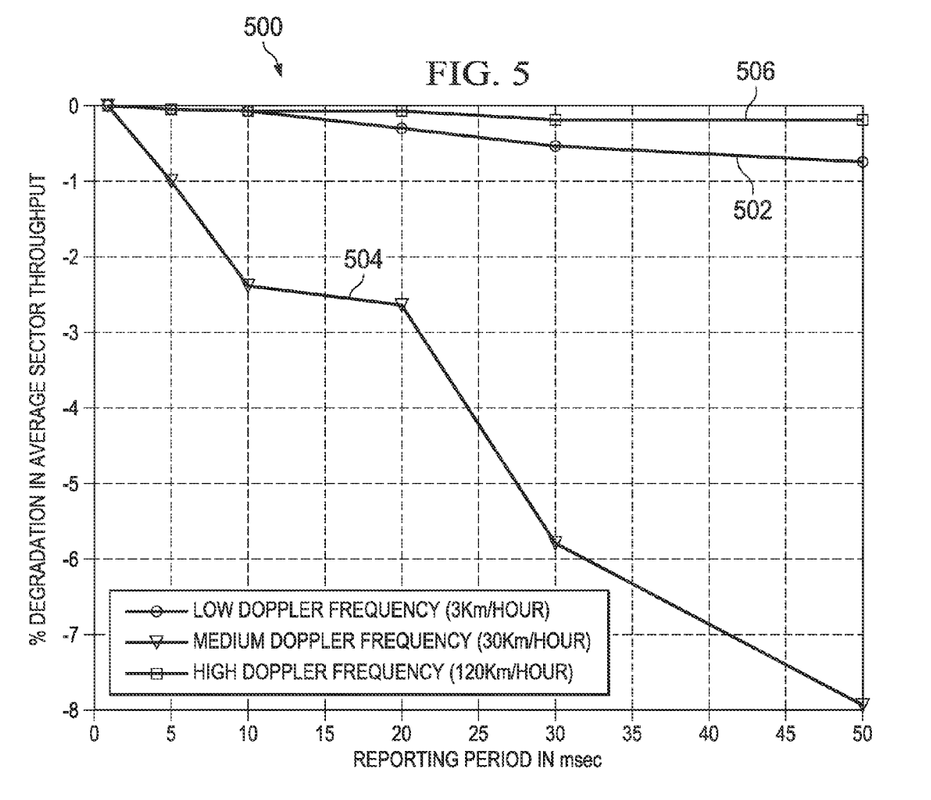
FIG. 5 is a graph which shows the impact that CQI reporting delay has on downlink throughput performance for low speed UEs (low Doppler frequencies), medium speed UEs (medium Doppler frequencies), and high speed UEs (high Doppler frequencies)

To describe the technical features of the present disclosure, a detailed discussion is provided first to explain the general idea about why and under what circumstances it is desirable to adapt a CQI reporting period for a UE in accordance with the present disclosure (see FIG. 5). Then, a discussion is provided to explain an exemplary process to adapt a CQI reporting period for a UE in accordance with the present disclosure (see FIGS. 6-7). A discussion is then provided to describe how the access node (e.g., Node B) and the control node (e.g., RNC) each operate to adapt a CQI reporting period for a UE in accordance with the present disclosure (see FIGS. 8-9). Finally, a discussion is provided to describe how the wireless communication network (comprising the access node and the control node) can operate to adapt a CQI reporting period for a UE in accordance with different embodiments of the present disclosure (see FIGS. 10-11).

Although the process to adapt the CQI reporting period for a UE is described herein based on a wireless communication system configured in accordance with the UTRA/HSPA standards it should be appreciated that the process can be applied to any RAT or multi-RAT system where the UE operates using multiple carriers including e.g., LTE FDD/TDD, GSM/GERAN, Wi Fi, WLAN, WiMax, CDMA2000 etc. . . . In addition, it should be appreciated that the process described herein can also be applied for Multi RAB (radio bearers) where in some carriers there is simultaneously scheduled data plus speech.

It should also be appreciated that the non-limiting term access node is used herein and can refer to any radio network node or network node that provides access to and controls a UE such as the following (for example): a Node B, an access point (AP), an eNode B, a low power node, a femto node, a pico node etc. . . . Further, it should be appreciated that the non-limiting term control node is used herein and can refer to any radio network node or network node that controls a UE such as the following (for example): a RNC, a network controller, a central controlling node etc. . . . Finally, it should be appreciated that the non-limiting term user equipment (UE) is used herein and refers to any type of wireless device that communicates with an access node and control node in a wireless communication system such as the following (for example): a target device, a device-to-device (D2D) UE, a machine type UE, a UE capable of machine to machine (M2M) communication, a PDA, an iPad, a tablet, a mobile terminal, a smart phone, a laptop embedded equipment (LEE), a laptop mounted equipment (LME), a USB dongle etc . . .

General Idea

In the present disclosure, there is a process described to vary the reporting period for UEs based on their reported CQIs which are used to compute their Doppler frequency (moving speed). Referring to FIG. 5, there is a graph 500 which shows the impact that CQI reporting delay has on downlink throughput performance, where there is plotted the percentage degradation in average sector throughput vs. reporting period in msec. The results are plotted for three different UE speeds (Doppler frequencies) namely a low Doppler frequency 502, a medium Doppler frequency 504, and a high Doppler frequency 506. It can be seen from the graph 500 that as the reporting period increases there is a penalty in the average sector throughput. The impact for the low Doppler frequency UEs and for the high Doppler frequency UEs is below 1% if the reporting period is increased up to 50 msec. This is because for slow speed UEs the channel changes slowly and even with a reporting period at 50 msec, the probability that the CQI reported by the low speed UEs is still good for 50 msec is high. For high speed UEs the channel changes so fast such that the performance loss is almost the same for different reporting periods. However, the percentage loss in average sector throughput is severe for medium speed UEs. This is because for low reporting periods the CQI reported by the medium speed UE is valid, but as the reporting period increases the channel is outdated and the penalty in the average sector throughput becomes severe.

From reviewing the graph 500 it can be observed that fixing the reporting period for all UEs is not beneficial for overall system throughput. For example, if the reporting period was fixed to say 8 msec, then the same or very similar CQIs will be reported by the UE which is moving with a slow speed (slow Doppler frequency—e.g., 3 Km/hour), while the UE which is moving with a high speed high speed (high Doppler frequency—e.g., 120 Km/hour) reports a CQI which is outdated by the time the Node B schedules the high speed UE. Thus, there is no advantage of using not so frequent CQI reporting periods (high value) for the low speed UEs and high speed UEs. Accordingly, the graph 500 indicates that it is beneficial to adapt the reporting period of the low speed UEs and high speed UEs to high values, while adapting the reporting period to a low value for UEs which are moving with a medium speed (medium Doppler frequency—e.g., 30 Km/hour). An exemplary process that can adapt the reporting periods for UEs based on their moving speeds (Doppler frequencies) is discussed next.

Exemplary Process to Configure the CQI Reporting Period

The process to vary the reporting period for a UE based on their reported CQI which is used to determine their Doppler frequency (moving speed) has the following steps (see also FIGS. 6-7's message sequence charts):

Step 1: The RNC 602 configures the UE 606 with more than one carrier. In this example, the RNC 602 configures the UE 606 with a primary carrier 608 and a secondary carrier 610. The RNC 602 per the HSDPA (Release) standards can configure the UE 606 with up to eight carriers and this configuration can also depend on the UE category. In any case, the process has a requirement that the UE 606 is capable of receiving downlink data from at least two downlink carriers 608 and 610 (frequencies). The RNC 602 sends this information to the UE 606 using RRC signaling (see FIGS. 6-7's step A).

Step 2: The RNC 602 configures the reporting period 612 to a specific value (preferably a minimum value 2 msec). The RNC 602 sends this information to the UE 606 using RRC signaling (see FIGS. 6-7's step A).

Step 3: The Node B 604 transmits known symbols 613 (pilots 613) on the secondary carrier 610 to the UE 106 (see FIGS. 6-7's step B).

Figure 6:
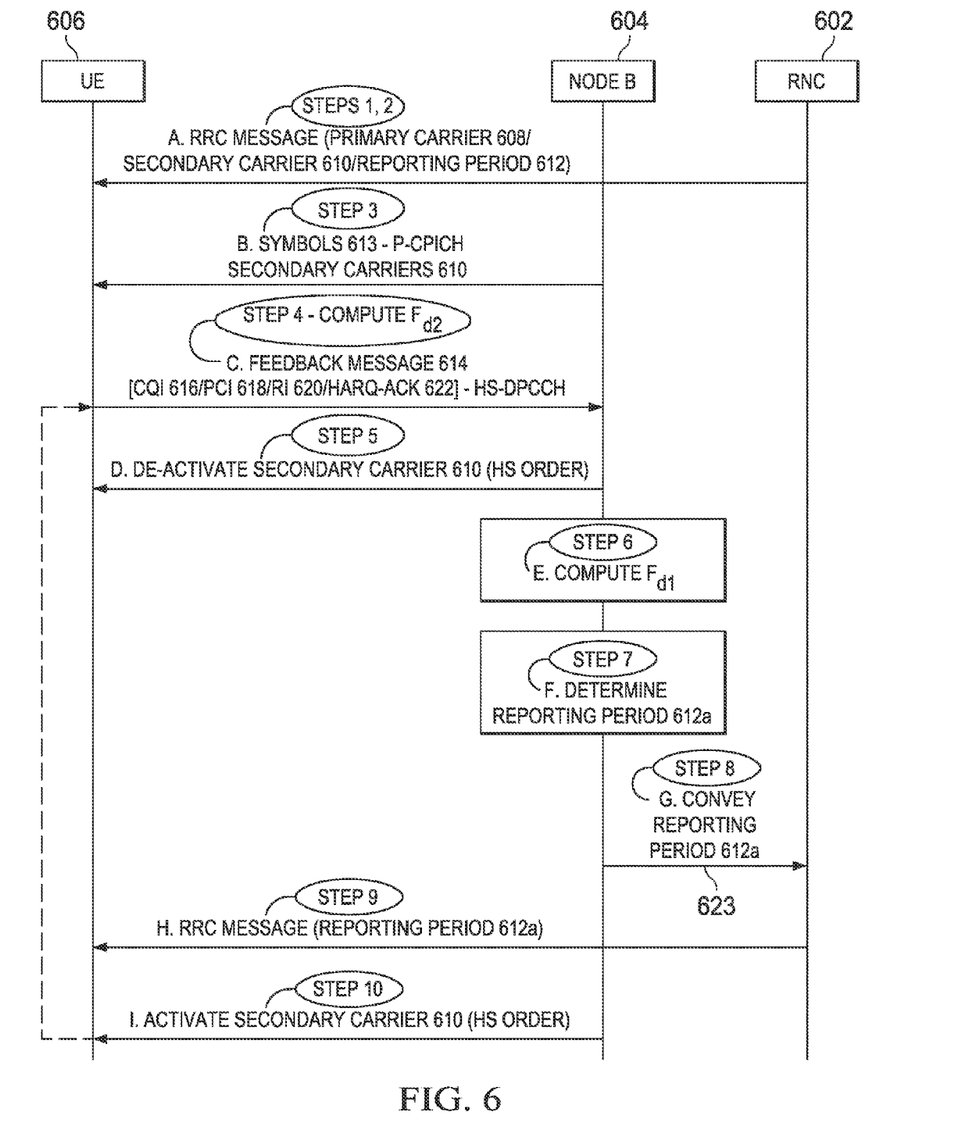
FIG. 6 is a message sequence chart that illustrates the signaling between a UE, an access node (e.g., Node B), and a control node (e.g., RNC) to implement a process to adapt the reporting period for the UE in accordance with one embodiment of the present disclosure.
Figure 7:
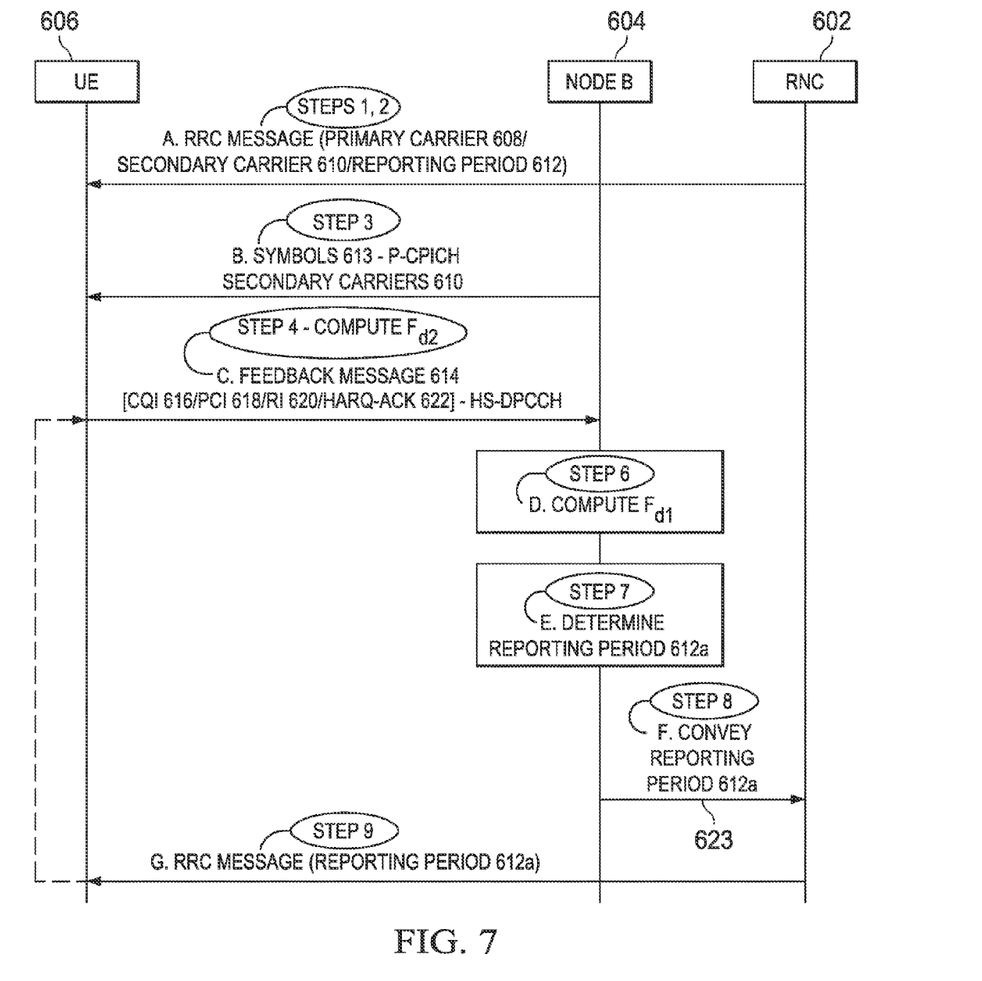
FIG. 7 is a message sequence chart that illustrates the signaling between the UE, the access node (e.g., Node B), and the control node (e.g., RNC) to implement a process to adapt the reporting period for the UE in accordance with another embodiment of the present disclosure.

Step 4: The Node B 604 receives the UE's feedback on the secondary carrier 608, where the feedback is in the form of a feedback message 614 which contains a CQI 616 (currently measured CQI 616), a PCI 618 (if applicable), RI 620 (if applicable), and HARQ-ACK 622 for the secondary carrier 610. The Node B 604 uses the CQI 616 to compute the measure of Doppler frequency ($F_{d2}$) as rate of change of the CQI for the secondary carrier 610 (see FIGS. 6-7's step C). For example, the Doppler frequency ($F_{d2}$) can be computed per the following equation:

$$F_{d2}=K^*\Delta CQI/\Delta t$$

where K is a constant, $\Delta CQI/\Delta t$ is the rate of the CQI change for the secondary carrier 610 over a period of time $\Delta t$. The $\Delta CQI$ is the difference between a currently reported CQI 616 and a previously reported CQI 616 and the $\Delta t$ is the amount of time between the currently reported CQI 616 and the previously reported CQI 616.

Step 5 (optional): Once the Doppler frequency ($F_{d2}$) on the secondary carrier 610 is computed, the secondary carrier 610 can be de-activated by the Node B 604 using a L1 signaling (for example HS-SCCH order) and then later activated by the Node B 604 after a period of time T in order to compute again the Doppler frequency ($F_{d2}$) (see FIG. 6's step D where the secondary carrier 610 is de-activated). In this situation, the secondary carrier 610 is only used for computing the Doppler frequency ($F_{d2}$). In another embodiment, the secondary carrier 610 is not activated and the Node B 604 can continuously keep track of the Doppler frequency ($F_{d2}$) which is an indication of the UE's speed (see FIG. 7). In this situation, the secondary carrier 610 can be used for other transmissions in addition to computing the Doppler frequency ($F_{d2}$).

Step 6: Once the Doppler frequency ($F_{d2}$) on the secondary carrier 610 is computed, then the Doppler frequency ($F_{d1}$) on the primary carrier 608 is computed by the Node B 604 as follows:

$$F_{d1}=F_{d2}^*(F_1/F_2)$$

where $F_{d1}$ is the Doppler frequency of the primary carrier 608, $F_{d2}$ is the Doppler frequency of the secondary carrier 610, $F_1$ is a frequency of the primary carrier 608, $F_2$ is a frequency of the secondary carrier 610 (see FIG. 6's step E and FIG. 7's step D).

Step 7: The Node B 604 computes the new reporting period 612a based at least on the computed Doppler frequency ($F_{d2}$) on the primary carrier 608 (see FIG. 6's step F and FIG. 7's step E). In one example, the Node B 604 can compute the new reporting period 612a by categorizing the computed Doppler frequency ($F_{d1}$) of the primary carrier 608 into one of a plurality of Doppler frequency ranges as follows:

a low Doppler frequency range: $F_{d1}<FL$ a medium Doppler frequency range: $FL<=F_{d1}<FH$ a high Doppler frequency range: $FH<=F_{d1}$ where FL is a low frequency threshold and FH is a high frequency threshold. The frequency thresholds FL and FH can be pre-computed by simulation or by analysis. This example uses three ranges but there can be any number of ranges.

Thereafter, the Node B 604 selects the new reporting period 612a for the UE 606 based on the particular Doppler frequency range (low Doppler range, medium Doppler range, high Doppler range) which corresponds to the computed Doppler frequency ($F_{d1}$) of the primary carrier 608. For example, the Node B 604 selects the new reporting period 612a having a value $T_{max1}$ if the computed Doppler frequency ($F_{d1}$) corresponds to the low Doppler range. Or, the Node B 604 selects the new reporting period 612a having a value $T_{min}$ if the computed Doppler frequency ($F_{d1}$) corresponds to the medium Doppler range. Or, the Node B 604 selects the new reporting period 612a having a value $T_{max2}$ if the computed Doppler frequency ($F_{d1}$) corresponds to the high Doppler range. The $T_{max1}$, $T_{min}$ and $T_{max2}$ can be values determined from a simulation such as the exemplary simulation shown in FIG. 5's graph 500 where it was observed that for low and high Doppler frequency ranges the setting of a reporting period 612a to a high value(s) does not degrade the average sector throughput. Hence, if the UE 604 has a low Doppler frequency or a high Doppler frequency then the reporting period 612a can be adapted to $T_{max1}$ and $T_{max2}$ respectively. As observed in graph 500, if the UE 606 has a medium Doppler frequency then the reporting period 612a can be set to $T_{min}$. The $T_{max1}>T_{min}$ and $T_{max2}>T_{min}$.

Step 8: The Node B 604 conveys the selected reporting period 612a to the RNC 602 through Iub signaling (see FIG. 6's step G and FIG. 7's step F).

Step 9: RNC 602 re-configures the UE 604 with the chosen reporting period 612a through RRC signaling (see FIG. 6's step H and FIG. 7's step G). The chosen reporting period 612a indicates how often the UE 606 is to send a second feedback message which contains a CQI 616, a PCI 618 (if applicable), RI 620 (if applicable), and HARQ-ACK 622 for the secondary carrier 610. It should be appreciated that the second feedback message contains CQI 616, PCI 618 (if applicable), RI 620 (if applicable), and HARQ-ACK 622 current values which can and will likely be different than step 4's feedback message's CQI 616, PCI 618 (if applicable), RI 620 (if applicable), and HARQ-ACK 622 previous values.

Step 10: If the Node B 604 de-activated the secondary carrier 610 in step 5, then after the predetermined time T the Node B 604 re-activates the secondary carrier 610 for the UE 606 and then steps 4-9 are repeated (see FIG. 6's step I). If the Node B 604 did not deactivate the secondary carrier 610 in step 5, then after a predetermined time T steps 4-9 are repeated.

Note: The Node B 604 does not receive a feedback message for the primary carrier 608 and then compute the Doppler frequency ($F_{d1}$) on the primary carrier 608 directly to adapt the reporting period because the measurements may not be correct as it introduces bias in the measurements.

Figure 8:
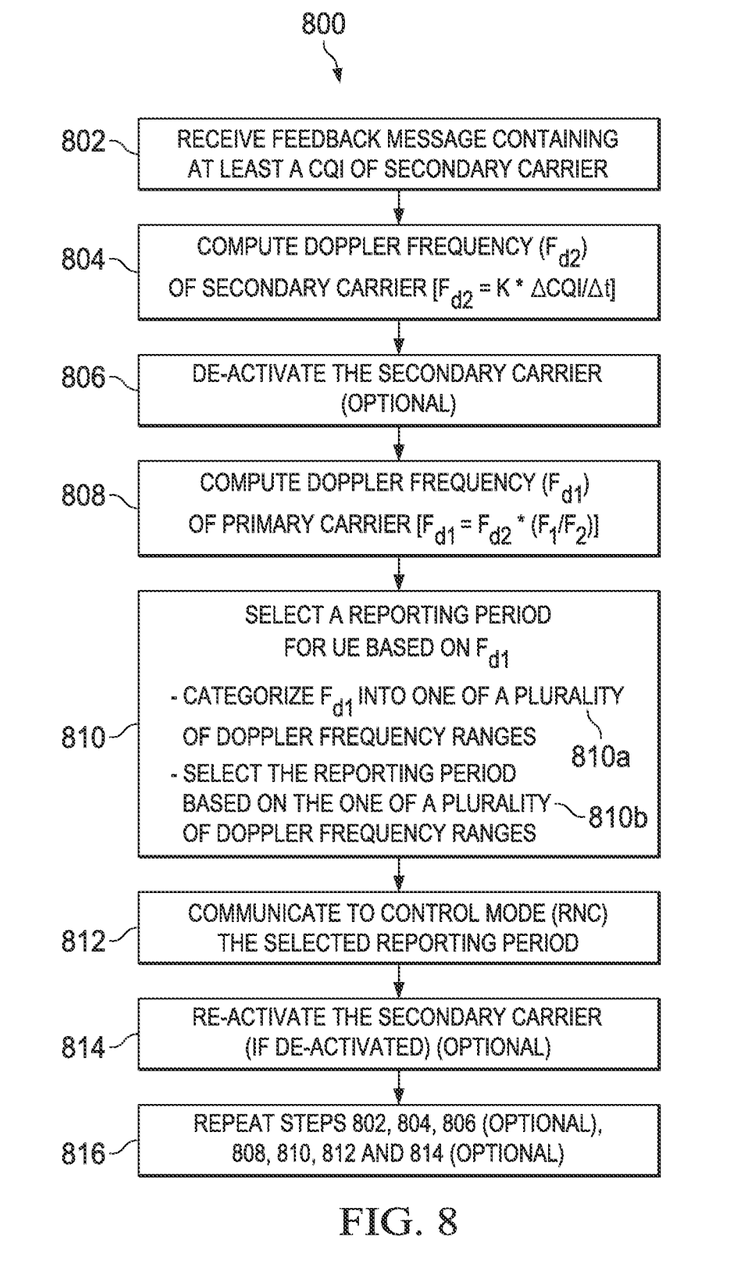
FIG. 8 is a flowchart of a method in the access node (e.g., Node B) for adapting a reporting period for the UE in accordance with an embodiment of the present disclosure.

Referring to FIG. 8, there is a flowchart of a method 800 in the access node 604 (e.g., Node B 604) for adapting a reporting period 612 for the UE 606 in accordance with an embodiment of the present disclosure. At step 802, the access node 604 receives the feedback message 614 from the UE 606, where the feedback message 614 contains the CQI 616, the PCI 618 (if applicable), the RI 620 (if applicable), and the HARQ-ACK 622 for the secondary carrier 610 (see FIGS. 6-7's step C). At step 804, the access node 604 computes the Doppler frequency ($F_{d2}$) of the secondary carrier 610 using the CQI 616 of the secondary carrier 610 (see FIGS. 6-7's step C). For example, the access node 604 can compute the Doppler frequency ($F_{d2}$) of the secondary carrier 610 using the following equation: $F_{d2}=K*\Delta CQI/\Delta t$, where $F_{d2}$ is the Doppler frequency of the secondary carrier 610, K is a constant, and $\Delta CQI/\Delta t$ is a rate of CQI change for the secondary carrier 610 over a period of time $\Delta t$. At step 806 (optional), the access node 604 de-activates the secondary carrier 610 after computing the Doppler frequency ($F_{d2}$) of the secondary carrier 610 (see FIG. 6's step D) (note: step 806 can be performed at any time after step 802). At step 808, the access node 604 computes the Doppler frequency ($F_{d1}$) of the primary carrier 608 using the computed Doppler frequency ($F_{d2}$) of the secondary carrier 610 (see FIG. 6's step E and FIG. 7's step D). For instance, the access node 604 can compute the Doppler frequency ($F_{d1}$) of the primary carrier 608 per following equation: $F_{d1}=F_{d2}*(F_1/F_2)$, where $F_{d1}$ is the Doppler frequency of the primary carrier 608, $F_{d2}$ is the Doppler frequency of the secondary carrier 610, $F_1$ is a frequency of the primary carrier 608, $F_2$ is a frequency of the secondary carrier 610. At step 810, the access node 604 selects a reporting period 612a for the user equipment 606 based on the computed Doppler frequency ($F_{d1}$) of the primary carrier 608 (see FIG. 6's step F and FIG. 7's step E). For instance, the access node 604 can select the reporting period 612a for the user equipment 606 by: (1) categorizing the computed Doppler frequency ($F_{d1}$) of the primary carrier 608 into one of a plurality of Doppler frequency ranges (e.g., low Doppler frequency range, medium Doppler frequency range, and high Doppler frequency range) (step 810a); and (2) select the reporting period 612a for the user equipment 606 based on the one of the plurality of Doppler frequency ranges (step 810b). At step 812, the access node 604 communicates the selected reporting period 612a for the user equipment 606 to the control node 602 (see FIG. 6's step G and FIG. 7's step F). At step 814 (optional), the access node 604 re-activates the secondary carrier 610 after a predetermined period of time T if it was de-activated in step 806 (see FIG. 6's step I). At step 816, the access node 604 repeats steps 802, 804, 806 (optional), 808, 810, 812 (optional) and 814.

Figure 9:
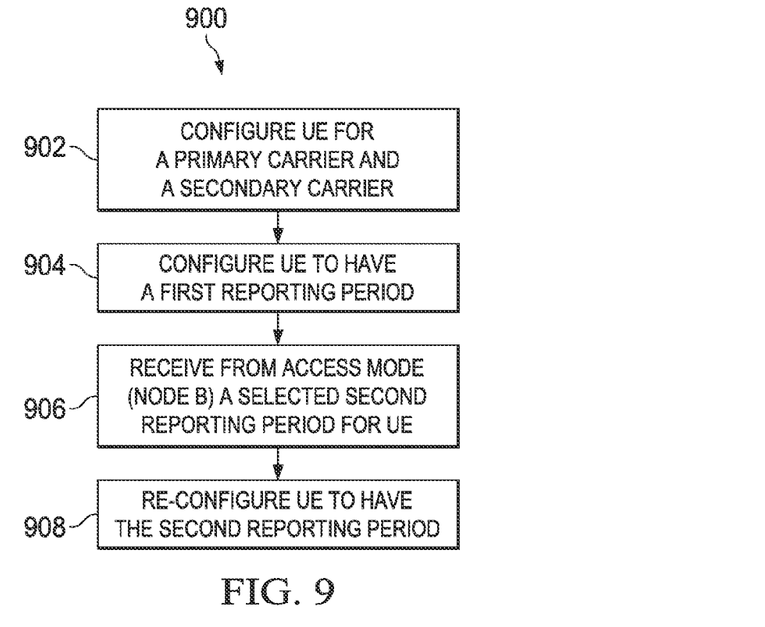
FIG. 9 is a flowchart of a method in the control node (e.g., RNC) for adapting a reporting period for the UE in accordance with an embodiment of the present disclosure.

Referring to FIG. 9, there is a flowchart of a method 900 in the control node 602 (e.g., RNC 602) for adapting the reporting period 612 for the UE 606 in accordance with an embodiment of the present disclosure. At step 902, the control node 602 configures the UE 606 for the primary carrier 608 and the secondary carrier 610 (see FIGS. 6-7's step A). At step 904, the control node 602 configures the UE 606 to have a first reporting period 612 which indicates how often the UE 606 is to send a feedback message 614 to the access node 604, where the feedback message 614 contains the CQI 616, the PCI 618 (if applicable), the RI 620 (if applicable), and the HARQ-ACK 622 for the secondary carrier 610 (see FIGS. 6-7's step A). At step 906, the control node 602 receives a message 623 from the access node 604, where the message 623 indicates a second reporting period 612a to be used by the UE 606 (see FIG. 6's step G and FIG. 7's step F). At step 908, the control node 602 re-configures the UE 606 to have the second reporting period 612a which indicates how often the UE 606 is to send a second feedback message 614a containing the CQI for the secondary carrier 610 to the access node 604 (see FIG. 6's step H and FIG. 7's step G).

Figure 10:
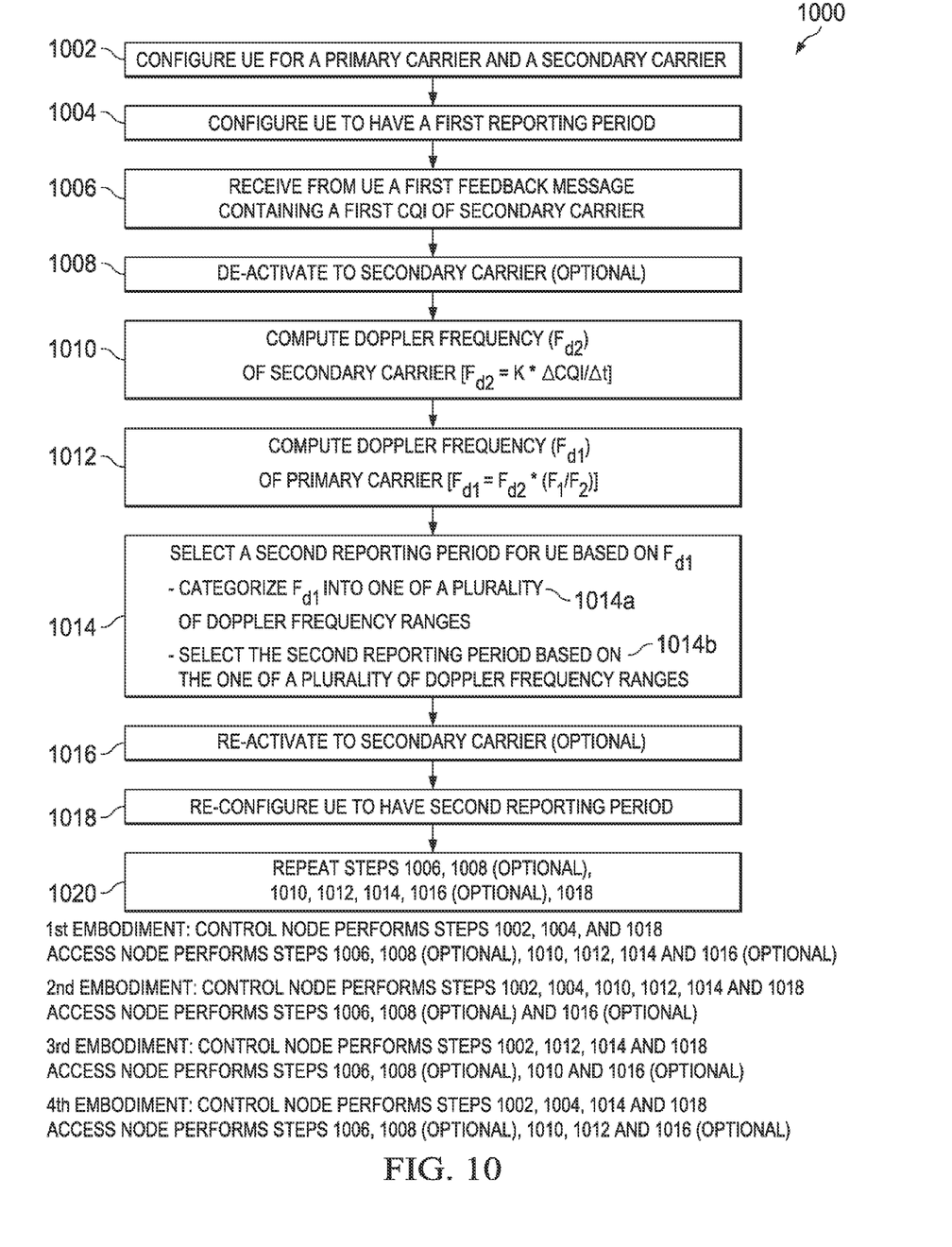
FIG. 10 is a flowchart of a method in the wireless communication network (comprising the access node and the control node) for adapting a reporting period for the UE in accordance with different embodiments of the present disclosure; and, FIG. 11 is a schematic view of the control node (e.g., RNC), the access node (e.g., Node B), and the UE each of which are configured to implement the various processes and methods shown in FIGS. 6-10 in accordance with different embodiments of the present disclosure.

Referring to FIG. 10, there is a flowchart of a method 1000 in the wireless communication network 600 (which comprises the access node 604 and the control node 602) for adapting the reporting period 612 for the UE 606 in accordance with different embodiments of the present disclosure. At step 1002, the wireless communication network 600 configures the UE 606 for the primary carrier 608 and the secondary carrier 610 (see FIGS. 6-7's step A). At step 1006, the wireless communication network 600 receives the feedback message 614 from the UE 606, where the feedback message 614 contains the CQI 616, the PCI 618 (if applicable), the RI 620 (if applicable), and the HARQ-ACK 622 for the secondary carrier 610 (see FIGS. 6-7's step C). At step 1008 (optional), the wireless communication node 600 de-activates the secondary carrier 610 (see FIG. 6's step D). At step 1010, the wireless communication network 600 computes the Doppler frequency ($F_{d2}$) of the secondary carrier 610 using the CQI 616 of the secondary carrier 610 (see FIGS. 6-7's step C). For example, the wireless communication network 600 can compute the Doppler frequency ($F_{d2}$) of the secondary carrier 610 using the following equation: $F_{d2}=K*\Delta CQI/\Delta t$, where $F_{d2}$ is the Doppler frequency of the secondary carrier 610, K is a constant, and $\Delta CQI/\Delta t$ is a rate of CQI change for the secondary carrier 610 over a period of time $\Delta t$. At step 1012, the wireless communication network 600 computes the Doppler frequency ($F_{d1}$) of the primary carrier 608 using the computed Doppler frequency ($F_{d2}$) of the secondary carrier 610 (see FIG. 6's step E and FIG. 7's step D). For instance, the wireless communication network 600 can compute the Doppler frequency ($F_{d1}$) of the primary carrier 608 per following equation: $F_{d1}=F_{d2}*(F_1/F_2)$, where $F_{d1}$ is the Doppler frequency of the primary carrier 608, $F_{d2}$ is the Doppler frequency of the secondary carrier 610, $F_1$ is a frequency of the primary carrier 608, $F_2$ is a frequency of the secondary carrier 610. At step 1014, the wireless communication network 600 selects a reporting period 612$a$ for the user equipment 606 based on the computed Doppler frequency ($F_{d1}$) of the primary carrier 608 (see FIG. 6's step F and FIG. 7's step E). For instance, the wireless communication network 600 can select the reporting period 612$a$ for the user equipment 606 by: (1) categorizing the computed Doppler frequency ($F_{d1}$) of the primary carrier 608 into one of a plurality of Doppler frequency ranges (e.g., low Doppler frequency range, medium Doppler frequency range, and high Doppler frequency range) (step 1014$a$); and (2) select the reporting period 612$a$ for the user equipment 606 based on the one of the plurality of Doppler frequency ranges (step 1014$b$). At step 1016 (optional), the wireless communication network 600 re-activates the secondary carrier 610 after a predetermined period of time T if it was de-activated in step 1008 (see FIG. 6's step I). At step 1018, the wireless communication network 600 re-configures the UE 606 to have the selected reporting period 612$a$ which indicates how often the UE 606 is to send a second feedback message 614$a$ containing the CQI 616 for the secondary carrier 610 to the access node 604 (see FIG. 6's step H and FIG. 7's step G). At step 1020, the wireless communication network 600 repeats steps 1006, 1008 (optional), 1010, 1012, 1014, 1016 (optional), and 1018.

In a first embodiment, the wireless communication system 600 comprises the access node 604 and the control node 602. The control node 602 performs the two configuring steps 1002 and 1004. The access node 604 performs the receiving step 1006, the two computing steps 1010 and 1012, the selecting step 1014, and further performs a communicating step in which the selected second reporting period 614$a$ is sent to the control node 602 which then performs the re-configuring step 1018. The access node 604 may perform the de-activating step 1008 (optional) and the re-activating step 1016 (optional)

In a second embodiment, the wireless communication system 600 comprises the access node 604 and the control node 602. The control node 602 performs the two configuring steps 1002 and 1004. The access node 604 performs the receiving step 1006 and further performs a communicating step in which the received CQI 616 of the secondary carrier 610 is sent to the control node 602 which then performs the two computing steps 1010 and 1012, the selecting step 1014, and the re-configuring step 1018. The access node 604 may perform the de-activating step 1008 (optional) and the re-activating step 1016 (optional)

In a third embodiment, the wireless communication system 600 comprises the access node 604 and the control node 602. The control node 602 performs the two configuring steps 1002 and 1004. The access node 604 performs the receiving step 1006, the first computing step 1010 and further performs a communicating step in which the computed Doppler frequency ($F_{d2}$) of the secondary carrier 610 is sent to the control node 602 which then performs the second computing step 1012, the selecting step 1014, and the re-configuring step 1018. The access node 604 may perform the de-activating step 1008 (optional) and the re-activating step 1016 (optional).

In a fourth embodiment, the wireless communication system 600 comprises the access node 604 and the control node 602. The control node 602 performs the two configuring steps 1002 and 1004. The access node 604 performs the receiving step 1006. The access node 604 performs the receiving step 1006, the two computing steps 1010 and 1012, and further performs a communicating step in which the computed Doppler frequency ($F_{d1}$) of the primary carrier 608 is sent to the control node 602 which then performs the selecting step 1014, and the re-configuring step 1018. The access node 604 may perform the de-activating step 1008 (optional) and the re-activating step 1016 (optional).

Figure 11:
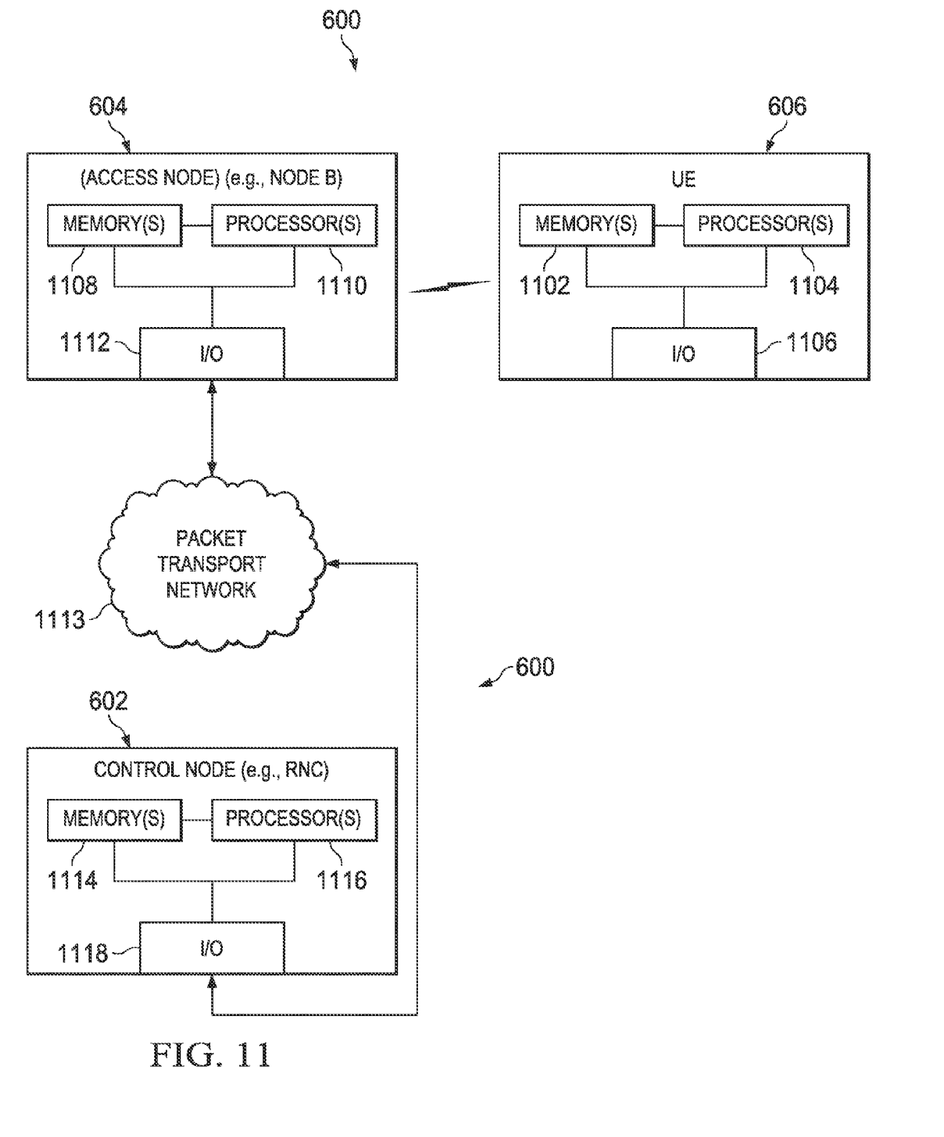

Referring to FIG. 11, there is a schematic view of the control node 602 (e.g., RNC 602), the access node 604 (e.g., Node B 604), and the UE 606 each of which are configured to implement the various processes and methods shown in FIGS. 6-10 in accordance with different embodiments of the present disclosure. The UE 606 comprises a memory 1102, a processor 1104 for executing instructions stored in the memory 1102 and an input/output device 1106 for communication with other nodes and devices. The UE 606 is in radio connection with the access node 604 (e.g., Node B 604) which comprises a memory 1108, a processor 1110 suitable for executing instructions stored in the memory 1108 as well as an input/output device 1112 which is connected to a packet transport network 1113. The control node 602 (e.g., RNC 602) comprises a memory 1114, a processor 1116 suitable for executing instructions stored in the memory 1114 as well as an input/output device 1118 which is also connected to the packet transport network 1113. The present arrangement of the control node 602 (e.g., RNC 602), the access node 604 (e.g., Node B 604), and the UE 606 are suitable for executing the various processes and methods 800, 900 and 1000 disclosed herein with respect to FIGS. 6-10.

It should be noted that the control node 602 (e.g., RNC 602), the access node 604 (e.g., Node B 604), and the UE 606 each comprise many other components which are well known in the art but for clarity the well known components are not described herein. Moreover, it should be noted that a typical network would comprise multiple UEs 606, multiple access nodes 604 (e.g., Node Bs 604) as well as a plethora of other network nodes.

Further, it should be noted that there are many different types of memories 1102, 1108 and 1114 available, such as solid states drives, hard drives, RAM, ROM, EPROM, EEPROM etc. which could be used in implementing embodiments disclosed herein. The memory 1102 used for the UE 606 would typically be different from the memory 1114 used for the control node 602 (e.g., RNC 602), however there is absolutely nothing preventing them for utilizing the same kind of memory. Also, while not indicated in the schematic view, there might be multiple different memories and processors in the devices disclosed. Typically, there would be persistent storage as well as Random Access Memory. Also the processors 1104, 1110 and 1116 indicated in the schematic view can be implemented in many different forms, such as an off-the-shelf microcontroller, an ASIC, FPGA etc . . .

In view of the foregoing, it should be appreciated that there is a process described herein to vary the CQI reporting period for UEs based on its channel characteristics namely its Doppler frequency. The main features of this process are as follows:

Activate both a primary carrier 608 and a secondary carrier 610 (for example using a HS-SCCH order) and compute the Doppler metric from the CQI 616 of the secondary carrier 610 reported by the UE 606 for certain duration.

From the secondary carrier Doppler metric, derive the Doppler metric of the primary carrier 608. This information is used to determine a new reporting period 612$a$ for the UE 606.

The RNC 602 configures the new reporting period 612a and conveys this new reporting period 612a using RRC re-configuration signaling to the specific UE 606.

The process has the aforementioned advantages (for example): (1) reducing the interference in uplink frequencies; (2) enhancing the use of the user equipment's battery power; and (3) utilizing all the benefits of AMC. In addition, the process has some other advantages as follows (for example): (1) providing significant gains in the uplink capacity without compromising on the capacity of downlink; and (2) providing a fast method to configure the reporting period.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. An access node configured to adapt a reporting period for a user equipment, wherein the user equipment is configured for a primary carrier and a secondary carrier, and wherein the access node interfaces with the user equipment and a control node, the access node comprising:
   at least one processor;
   and, at least one memory that stores processor-executable instructions, wherein the at least one processor interfaces with the at least one memory to execute the processor-executable instructions, whereby the access node is operable to:
   receive, from the user equipment, a first feedback message containing a first channel quality indicator (CQI) of the secondary carrier;
   compute a Doppler frequency (Fd2) of the secondary carrier using the first CQI of the secondary carrier;
   compute a Doppler frequency (Fd1) of the primary carrier using the computed Doppler frequency (Fd2) of the secondary carrier;
   select a second reporting period for the user equipment based on the computed Doppler frequency (Fd1) of the primary carrier, wherein the selected second reporting period indicates how often the user equipment is to send a second feedback message containing a second CQI of the secondary carrier;
   and, communicate the selected second reporting period for the user equipment to the control node.

2. The access node of claim 1, wherein the access node is operable to periodically repeat the receive operation, the two compute operations, the select operation, and the communicate operation.

3. The access node of claim 1, wherein the access node is operable to compute the Doppler frequency (Fd2) of the secondary carrier per the following equation:

$$Fd2 = K^* \Delta CQI/\Delta t$$

where Fd2 is the Doppler frequency of the secondary carrier, K is a constant, and $\Delta CQI/\Delta t$ is a rate of CQI change for the secondary carrier over a period of time $\Delta t$.

4. The access node of claim 1, wherein the access node is operable to de-activate the secondary carrier after computing the Doppler frequency (Fd2) of the secondary carrier and then re-activate the secondary carrier after a predetermined amount of time.

5. The access node of claim 1, wherein the access node is operable to compute the Doppler frequency (Fd1) of the primary carrier per the following equation:

$$Fd1 = Fd2^*(F1/F2)$$

where Fd1 is the Doppler frequency of the primary carrier, Fd2 is the Doppler frequency of the secondary carrier, F1 is a frequency of the primary carrier, and F2 is a frequency of the secondary carrier.

6. The access node of claim 1, wherein the access node is operable to select the second reporting period for the user equipment as follows:
   categorize the computed Doppler frequency (Fd1) of the primary carrier into one of a plurality of Doppler frequency ranges;
   and, select the second reporting period for the user equipment based on the one of the plurality of Doppler frequency ranges.

7. The access node of claim 5, wherein the access node is operable to categorize the computed Doppler frequency (Fd1) of the primary carrier into one of a plurality of Doppler frequency ranges as follows:
   a low Doppler frequency range: Fd1<FL
   a medium Doppler frequency range: FL<=Fd1<FH
   a high Doppler frequency range: FH<=Fd1
where FL is a low frequency threshold and FH is a high frequency threshold.

8. A method in an access node for adapting a reporting period for a user equipment, wherein the user equipment is configured for a primary carrier and a secondary carrier, and wherein the access node interfaces with the user equipment and a control node, the method comprising:
   receiving, from the user equipment, a first feedback message containing a first channel quality indicator (CQI) of the secondary carrier;
   computing a Doppler frequency (Fd2) of the secondary carrier using the first CQI of the secondary carrier;
   computing a Doppler frequency (Fd1) of the primary carrier using the computed Doppler frequency (Fd2) of the secondary carrier;
   selecting a selected reporting period for the user equipment based on the computed Doppler frequency (Fd1) of the primary carrier, wherein the selected reporting period indicates how often the user equipment is to send a second feedback message containing a second CQI of the secondary carrier;
   and, communicating the selected second reporting period for the user equipment to the control node.

9. The method of claim 8, further periodically repeating the receiving step, the two computing steps, the selecting step, and the communicating step.

10. The method of claim 8, wherein the computing of the Doppler frequency (Fd2) of the secondary carrier is performed per following equation:

$$Fd2 = K^* \Delta CQI/\Delta t$$

where Fd2 is the Doppler frequency of the secondary carrier, K is a constant, and
$\Delta CQI/\Delta t$ is a rate of CQI change for the secondary carrier over a period of time $\Delta t$.

11. The method of claim 8, further comprising de-activating the secondary carrier after computing the Doppler frequency (Fd2) of the secondary carrier and then re-activating the secondary carrier after a predetermined amount of time.

12. The method of claim 8, wherein the computing of the Doppler frequency (Fd1) of the primary carrier is performed per following equation:

$$Fd1=Fd2*(F1/F2)$$

where Fd1 is the Doppler frequency of the primary carrier, Fd2 is the Doppler frequency of the secondary carrier, F1 is a frequency of the primary carrier, F2 is a frequency of the secondary carrier.

13. The method of claim 8, wherein the selecting of the reporting period for the user equipment is performed as follows:
   categorizing the computed Doppler frequency (Fd1) of the primary carrier into one of a plurality of Doppler frequency ranges;
   and, selecting the reporting period for the user equipment based on the one of the plurality of Doppler frequency ranges.

14. The method of claim 13, wherein the categorizing of the computed Doppler frequency (Fd1) of the primary carrier into one of a plurality of Doppler frequency ranges is performed as follows:
   a low Doppler frequency range: Fdi<FL
   a medium Doppler frequency range: FL <=Fdi<FH
   a high Doppler frequency range: FH <=Fdi
where FL is a low frequency threshold and FH is a high frequency threshold.

15. A control node configured to adapt a reporting period for a user equipment, wherein the control node interfaces with the user equipment and an access node, the control node comprising:
   at least one processor;
   and, at least one memory that stores processor-executable instructions, wherein the at least one processor interfaces with the at least one memory to execute the processor-executable instructions, whereby the control node is operable to:
   configure the user equipment for a primary carrier and a secondary carrier;
   configure the user equipment to have a first reporting period which indicates how often the user equipment is to send a first feedback message containing a first channel quality indicator (CQI) for the secondary carrier to the access node;
   receive, from the access node, a message indicating a second reporting period to be used by the user equipment;
   and, re-configure the user equipment to have the second reporting period which indicates how often the user equipment is to send a second feedback message containing a second CQI for the secondary carrier to the access node.

16. A method in control node for adapting a reporting period for a user equipment, wherein the control node interfaces with the user equipment and an access node, the method comprising:
   configuring the user equipment for a primary carrier and a secondary carrier;
   configuring the user equipment to have a first reporting period which indicates how often the user equipment is to send a first feedback message containing a first channel quality indicator (CQI) for the secondary carrier to the access node;
   receiving, from the access node, a message indicating a second reporting period to be used by the user equipment;
   and, re-configuring the user equipment to have the second reporting period which indicates how often the user equipment is to send a second feedback message containing a second CQI for the secondary carrier to the access node.

17. A method in a wireless communication system for adapting a reporting period for a user equipment, the method comprising:
   configuring the user equipment for a primary carrier and a secondary carrier;
   configuring the user equipment to have a first reporting period;
   receiving, from the user equipment, a first feedback message containing a first channel quality indicator (CQI) of the secondary carrier;
   computing a Doppler frequency (Fd2) of the secondary carrier using the first CQI of the secondary carrier;
   computing a Doppler frequency (Fd1) of the primary carrier using the computed Doppler frequency (Fd2) of the secondary carrier;
   selecting a second reporting period for the user equipment based on the computed Doppler frequency (Fd1) of the primary carrier, wherein the selected second reporting period indicates how often the user equipment is to send a second feedback message containing a second CQI of the secondary carrier;
   and, re-configuring the user equipment to have the second reporting period.

18. The method of claim 17, further periodically repeating the two configuring steps, the receiving step, the two computing steps, the selecting step, and the re-configuring step.

19. The method of claim 17, wherein the wireless communication system comprises an access node and a control node, wherein the control node performs the two configuring steps, then the access node performs the receiving step, the two computing steps, the selecting step and further performs a communicating step in which the selected second reporting period is sent to the control node which then performs the re-configuring step.

20. The method of claim 17, wherein the wireless communication system comprises an access node and a control node, wherein the control node performs the two configuring steps, then the access node performs the receiving step and further performs a communicating step in which the received first CQI of the secondary carrier is sent to the control node which then performs the two computing steps, the selecting step, and the re-configuring step.

21. The method of claim 17, wherein the wireless communication system comprises an access node and a control node, wherein the control node performs the two configuring steps, then the access node performs the receiving step, the first computing step and further performs a communicating step in which the computed Doppler frequency (Fd2) of the secondary carrier is sent to the control node which then performs the second computing step, the selecting step, and the re-configuring step.

22. The method of claim 17, wherein the wireless communication system comprises an access node and a control node, wherein the control node performs the two configuring steps, then the access node performs the receiving step, the two computing steps and further performs a communicating step in which the computed Doppler frequency (Fd1) of the primary carrier is sent to the control node which then performs the selecting step, and the re-configuring step.

23. The method of claim 17, wherein the computing of the Doppler frequency (Fd2) of the secondary carrier is performed per following equation:

$$Fd2 = K * \Delta CQI/\Delta t$$

where Fd2 is the Doppler frequency of the secondary carrier, K is a constant, and
ΔCQI/Δt is a rate of CQI change for the secondary carrier over a period of time Δt.

24. The method of claim 17, further comprising de-activating the secondary carrier after computing the Doppler frequency (Fd2) of the secondary carrier and then re-activating the secondary carrier after a predetermined amount of time.

25. The method of claim 17, wherein the computing of the Doppler frequency (Fd1) of the primary carrier is performed per following equation:

$$Fd1 = Fd2 * (F1/F2)$$

where Fd1 is the Doppler frequency of the primary carrier, Fd2 is the Doppler frequency of the secondary carrier, F1 is a frequency of the primary carrier, F2 is a frequency of the secondary carrier.

26. The method of claim 17, wherein the selecting of the reporting period for the user equipment is performed as follows:
categorizing the computed Doppler frequency (Fd1) of the primary carrier into one of a plurality of Doppler frequency ranges;
and, selecting the reporting period for the user equipment based on the one of the plurality of Doppler frequency ranges.

27. The method of claim 26, wherein the categorizing of the computed Doppler frequency (Fd1) of the primary carrier into one of a plurality of Doppler frequency ranges is performed as follows:
a low Doppler frequency range: Fd1<FL
a medium Doppler frequency range: FL <=Fd1<FH
a high Doppler frequency range: FH <=Fd1
where FL is a low frequency threshold and FH is a high frequency threshold.

\* \* \* \* \*